(12) United States Patent
Sun

(10) Patent No.: US 7,355,798 B2
(45) Date of Patent: Apr. 8, 2008

(54) OPTICAL SYSTEM FOR COLLIMATING ELLIPTICAL LIGHT BEAM AND OPTICAL DEVICE USING THE SAME

(75) Inventor: Wen-Hsin Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/321,306

(22) Filed: Dec. 29, 2005

(65) Prior Publication Data
US 2006/0221455 A1 Oct. 5, 2006

(30) Foreign Application Priority Data
Mar. 31, 2005 (CN) .......................... 2005 1 0033946

(51) Int. Cl.
G02B 27/30 (2006.01)
G02B 13/18 (2006.01)
G02B 3/02 (2006.01)
G11B 7/00 (2006.01)
G11B 7/135 (2006.01)

(52) U.S. Cl. .................. 359/641; 359/719; 369/44.23; 369/112.01

(58) Field of Classification Search ................ 359/641, 359/668, 669, 831, 837; 369/44.23, 112.01
See application file for complete search history.

(56) References Cited

U.S. PATENT DOCUMENTS

| | | | | |
|---|---|---|---|---|
| 5,107,477 A | * | 4/1992 | Fujita et al. | 369/44.24 |
| 6,154,433 A | * | 11/2000 | Hoshino et al. | 369/44.23 |
| 6,496,453 B2 | * | 12/2002 | Asada et al. | 369/44.23 |
| 2001/0046092 A1 | * | 11/2001 | Maruyama et al. | 359/837 |

FOREIGN PATENT DOCUMENTS

JP 2004-171629 * 6/2004

* cited by examiner

Primary Examiner—Alicia M Harrington
(74) Attorney, Agent, or Firm—Jeffrey T. Knapp

(57) ABSTRACT

An optical system (20) for efficiently collimating an elliptical light beam includes a light source (21), a collimator (22), and at least one prism (23,24). The light source is adapted for providing an elliptical light beam defining different diverging angles in different directions, wherein any cross-section of the elliptical light beam emitted from the light source defines a long axis and a short axis which are perpendicular to each other. The at least one prism is used for reconfiguring the elliptical light beam, thus obtaining a parallel round light beam having equivalent short axis and long axis.

3 Claims, 4 Drawing Sheets

OPTICAL SYSTEM FOR COLLIMATING ELLIPTICAL LIGHT BEAM AND OPTICAL DEVICE USING THE SAME

BACKGROUND OF THE PRESENT INVENTION

1. Field of the Invention

The present invention relates to an optical system for collimating an elliptical light beam, and particularly to an optical system for efficiently collimating elliptical light beams emitted from a side light emitting laser diode and an optical device using the same.

2. Related Art

Optical disks are widely used data store media, and are being developed to store more information than previously. Since higher data storing density is demanded of optical disks, optical disk reading/writing systems correspondingly need to be more precise and sophisticated.

Referring to FIG. 1, a conventional optical device 10 for providing a collimated parallel round light beam for reading/writing to an optical disk is shown. The optical device 10 includes a light source 110, an optical holographic element 120, a round collimating lens 130, a reflective mirror 140, an object mirror 150, and an optoelectronic detector 160. In operation, the light source 110 provides a light beam of a certain wavelength. The light beam reaches and passes through the optical holographic element 120, and thereafter is collimated by the collimating lens 130 into a parallel light beam. The parallel light beam is then reflected by the reflective mirror 140 to the object mirror 150. The object mirror 150 converges the parallel light beam to a recording layer 170 of an optical disk (not labeled). The light beam converged to the recording layer 170 is modulated in accordance with the data recorded thereon or written thereon, and is then reflected by the optical disk back to the object mirror 150. The light is then transmitted back to the optical holographic element 120 along the above-described input path. The optical holographic element 120 is adapted for deviating light beams that pass therethrough in the return direction. Therefore, the light beam is transmitted to and detected by the optoelectronic detector 160, rather than being transmitted to the light source 110. According to the light beam received, the optoelectronic detector 160 outputs an electronic signal, from which the information recorded on or written to the optical disk can be interpreted or identified.

A typical optical system adopts a side light emitting laser diode as a light source. Referring to FIG. 2, such a side light emitting laser diode 9 has a rectangular waveguide type resonation cavity. The laser light beam emitted from the resonation cavity has different diverging angles in horizontal directions and vertical directions respectively, and thus provides an elliptical light beam. Typically, the horizontal diverging angle is about ±10° and the vertical diverging angle is about ±30°. An elliptical light beam has to be intercepted or converted to a round light beam for use in the optical system.

In the above-described optical device 10, the round collimating lens 130 is employed for intercepting a round core part of the elliptical light beam and thus obtaining a round light beam. The collimating lens 130 generally has a diameter shorter than a corresponding short (e.g., horizontal) axis of a light spot projected by the elliptical light beam incident thereon. The core part of the elliptical light beam is allowed to pass through the round collimating lens 130, and the peripheral part of the elliptical light beam is dissipated. Referring to FIG. 3, this is a graph of a relationship between diverging angles of the elliptical light beam output by the side light emitting laser diode (X-axis) and intensity of light output by the collimating lens 130 (Y-axis). Various different horizontal diverging angles are collectively shown as the line $\theta_H$, and various different vertical diverging angles are collectively shown as the line $\theta_V$. The space between any two horizontally opposite points on the line $\theta_H$ represents the round core part of the elliptical light beam that is intercepted by the round collimating lens 130. The horizontal space between each such point and the corresponding point on the line $\theta_V$ represents a peripheral part of the elliptical light beam that is dissipated. As seen in FIG. 3, even if the round collimating lens 130 intercepts the elliptical light beam with a minimal amount of loss of light intensity (i.e. when both of the diverging angles are small), the amount of loss of light intensity is still quite large. Therefore, in general, a side light emitting laser diode with high power is needed to compensate for the loss of light intensity. However, high-power laser diodes are not only more costly, but also consume more power.

Therefore, what is needed is an optical system for efficiently collimating an elliptical light beam.

SUMMARY

An exemplary embodiment of the present optical system is for efficiently collimating an elliptical light beam and providing a substantially round light beam for reading/writing to an optical disk.

The optical system includes a light source, a first lens, and a second lens arranged in that sequence. The light source is adapted for providing an elliptical light beam defining different diverging angles in different directions. In particular, any cross-section of the elliptical light beam emitted from the light source defines a long axis and a short axis, which are perpendicular to each other. The first lens is adapted for diverging the elliptical light beam and enlarging the short axis so as to narrow a difference between the long axis and the short axis when the light beam passes therethough. The second lens is for converging the elliptical light beam and adjusting the short axis, thus obtaining a round light beam. A common optical axis is defined by the optical centers of the first lens and the second lens, and the elliptical light beams travels along the common optical axis.

An advantage of the optical system is that it can efficiently collimate the elliptical light beam emitting from the light source.

Another advantage is that a light source of relatively low power can be used in the optical system.

BRIEF DESCRIPTION OF THE DRAWINGS

The above-mentioned and other features and advantages of the optical system, and the manner of attaining them, will become more apparent and the invention will be better understood by reference to the following description of embodiments thereof taken in conjunction with the accompanying drawings.

Figure 1:
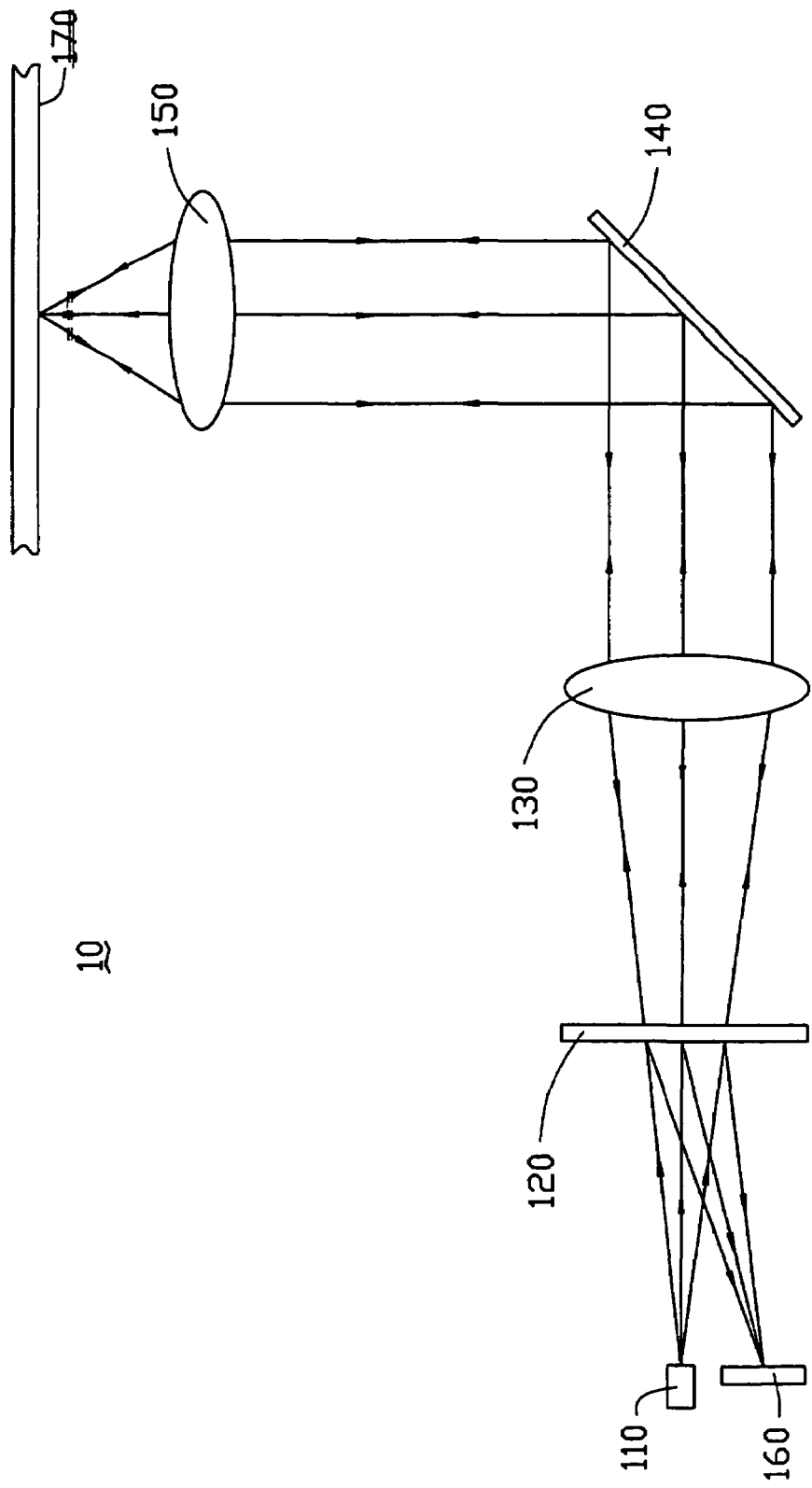
FIG. 1 is a schematic, front view of a conventional optical device for reading/writing to an optical disk, and also showing part of an optical disk and essential optical paths.
Figure 2:
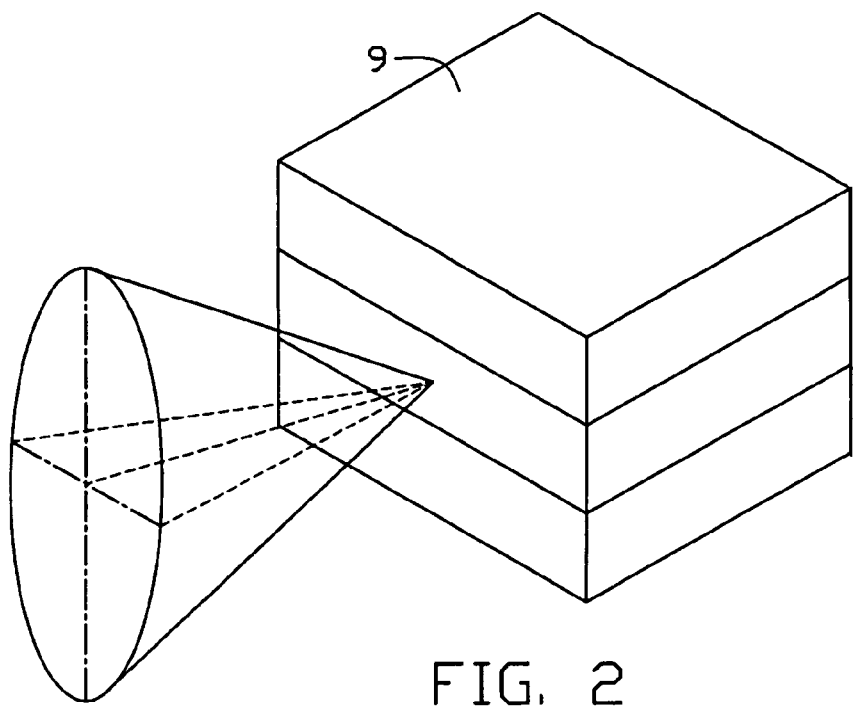
FIG. 2 is an enlarged, isometric view of a conventional light emitting laser diode, showing a diverging path of a light beam emitted therefrom.
Figure 3:
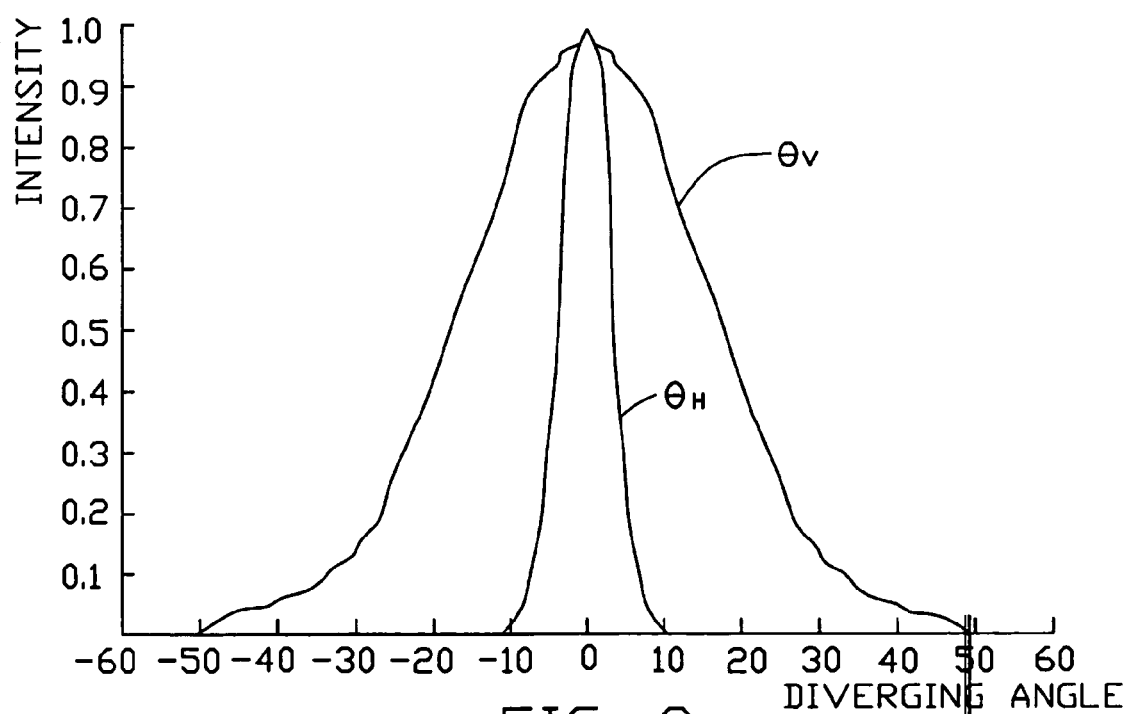
FIG. 3 is a graph showing a relationship between diverging angles of light emitted by a light emitting laser diode of the optical device of FIG. 1 (X-axis) versus light intensity output by a round collimating lens of the optical device (Y-axis).

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF PREFERRED EMBODIMENTS

Reference will now be made to the drawings to describe in detail the preferred embodiments of the present optical system and an optical device using the same.

Figure 4A:
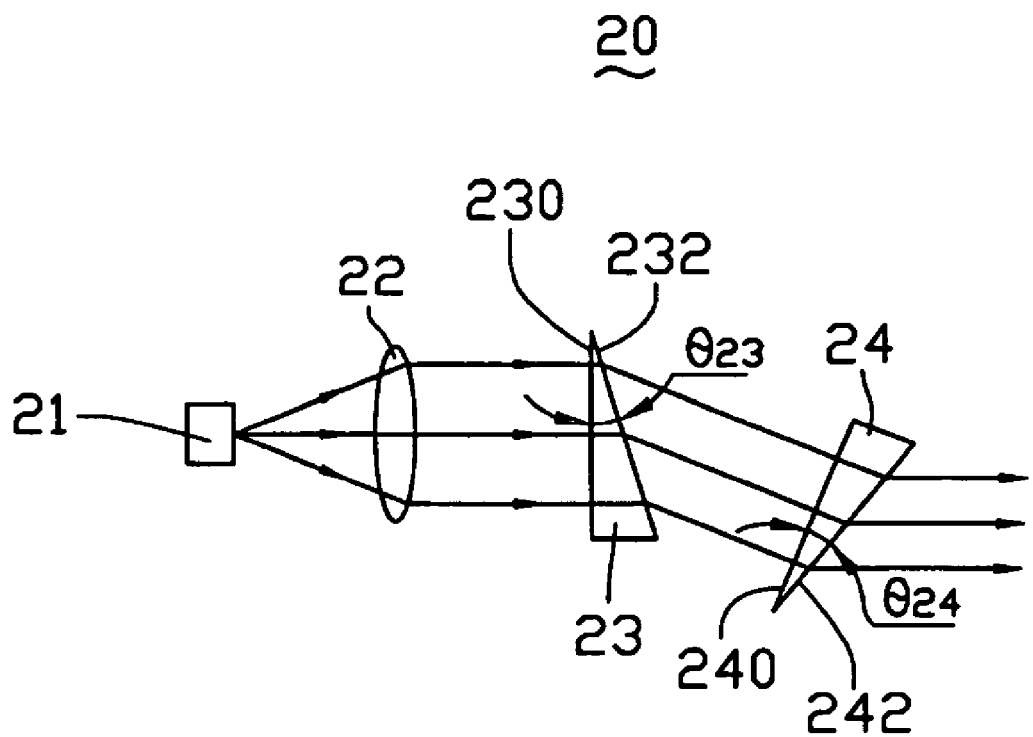
FIGS. 4A and 4B are respectively a schematic top view and a schematic front view of an optical system for collimating elliptical light beams according to an exemplary embodiment of the present invention, showing essential optical paths thereof.
Figure 4B:
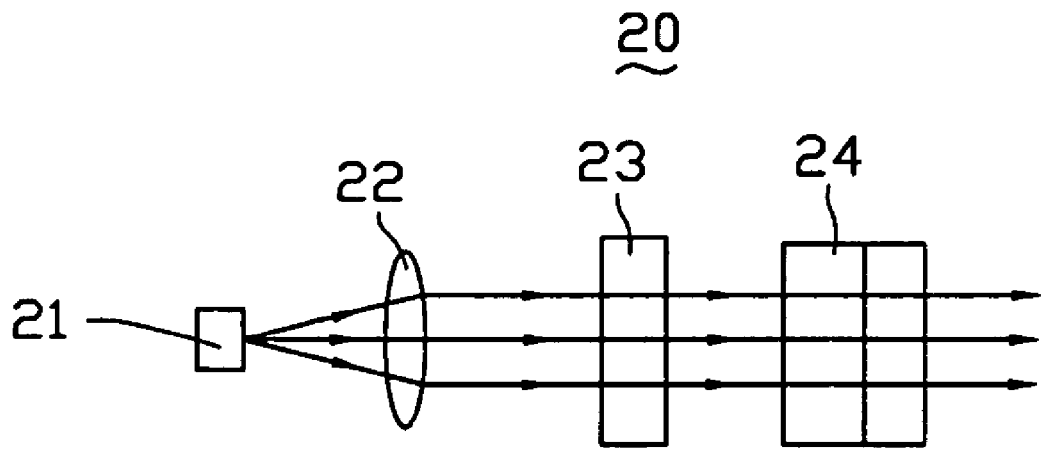

Referring to FIGS. 4A and 4B, they are respectively a schematic top view and a schematic front view mainly of an optical system 20 for collimating an elliptical light beam according to an exemplary embodiment of the present invention. The optical system 20 includes a light source 21, an optical collimator 22, a first prism 23, and a second prism 24 arranged in that sequence. The first and second prisms 23, 24 are successively arranged along a transmitting direction of the elliptical light beam that is outputted from the light source 21. The first and second prisms 23, 24 are spaced a distance from each other. The light source 21 is a side light emitting laser diode which has a rectangular waveguide type resonation cavity (not shown), from which the elliptical light beam can be emitted. The light source 21 is adapted for emitting a diverging elliptical light beam. Any cross-section of the elliptical light beam emitted from the light source 21 defines a long axis and a short axis, which are perpendicular to each other. The elliptical light beam also defines different diverging angles in different directions. In the illustrated embodiment, the maximum diverging angle is in a vertical direction and the minimum diverging angle is in a horizontal direction. Thus in the top view of the optical system 20 shown in FIG. 4A, the long axis is coplanar with the page, and the short axis is perpendicular to the page.

The collimator 22 is a round converging lens adapted for converting the diverging elliptical light beam outputted from the light source 21 into a parallel elliptical light beam. The first prism 23 has two surfaces 230, 232 defining an acute angle $\theta_{23}$. The first surface 230 is perpendicular to the parallel elliptical light beam, thus the parallel elliptical light beam can perpendicularly pass through the first surface 230 and reach the second surface 232. The parallel elliptical light beam incident to the second surface 232 has an incident angle equal to $\theta_{23}$. The parallel elliptical light beam can be refracted out from the second surface 232 at a given angle determined by a refractive index of a material of the first prism 23 and the angle $\theta_{23}$. Such a refraction to the parallel elliptical light beam results in a narrowing of the long axis of the parallel elliptical light beam as shown in FIG. 4A, while the short axis remains unchanged as shown in FIG. 4B. The narrowing of the long axis of the parallel elliptical light beam is a function of the refractive index of the material of the first prism 23 and the angle $\theta_{23}$ defined by the first surface 230 and the second surface 232 of the first prism 23. Accordingly, an appropriate selected angle $\theta_{23}$ in accordance with a refractive index of the first prism 23 can result in an expected narrowing of the long axis of the parallel elliptical light beam while the short axis remains unchanged, thus obtaining a parallel light beam outputted therefrom.

Likewise, the second prism 24 has two surfaces 240, 242 defining an acute angle $\theta_{24}$. The first surface 240 is perpendicular to the parallel light beam outputted from the first prism 23, thus the parallel light beam can perpendicularly pass through the first surface 240 and reach the second surface 242. The parallel light beam incident to the second surface 242 has an incident angle equal to $\theta_{24}$. The parallel light beam can be refracted out from the second surface 242 in a given angle determined by a refractive index of a material of the second prism 24 and the angle $\theta_{24}$. Similarly, such a refraction to the parallel elliptical light beam results in a further narrowing of the long axis of the parallel elliptical light beam as shown in FIG. 4A, while the short axis remains unchanged as shown in FIG. 4B. The further narrowing of the long axis of the parallel elliptical light beam is a function of the refractive index of the material of the second prism 24 and the angle $\theta_{24}$ defined by the first surface 240 and the second surface 242 of the second prism 24. An appropriate selected angle $\theta_{24}$ in accordance with a refractive index of the second prism 24 can result in an expected further narrowing of the long axis of the parallel elliptical light beam while the short axis remains unchanged.

As shown in FIGS. 4A and 4B, after a two times narrowing respectively by the first prism 23 and the second prism 24, the long axis of the parallel elliptical light beam is narrowed to be equal to the short axis of the parallel elliptical light beam, thus obtaining a parallel round light beam outputted from the second prism 24. The parallel round light beam outputted from the second prism 24 is then provided for further use in a reading/writing operation.

Even though the exemplary embodiment illustrate above includes two functional prisms 23 and 24, it is to be noted that a single prism or a prism set including more than two prisms can be used to perform the same function. When a single prism is used, an angle $\theta$ as defined similar to angle $\theta_{23}$ and angle $\theta_{24}$ is set in a given value so as to narrow the long axis of the parallel elliptical light beam substantially equal to the short axis of the parallel elliptical light beam, thus obtaining a parallel round light beam outputted from the single prism. The parallel round light beam outputted from the third lens 24 is then provided for further use in a reading/writing operation. Similarly, when a prism set including more than two prisms is used, the long axis is gradually narrowed by each of the prisms to be substantially equal to the short axis at last.

In summary, the optical system 20 is adapted for efficiently utilizing the light energy of a side light emitting laser diode. Thus in the exemplary embodiment, the efficiency of utilization of light emitted by the light source 21 is improved.

Figure 5:
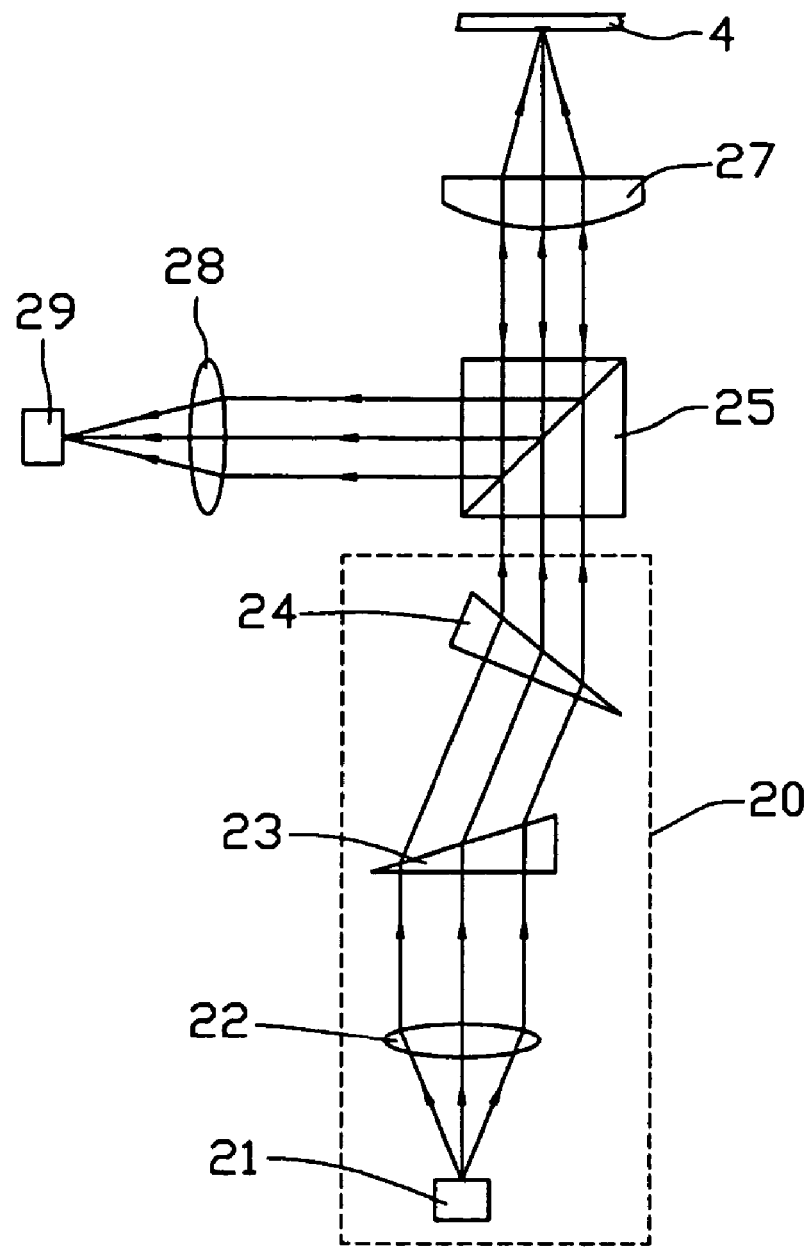
FIG. 5 is a schematic, front view of an optical device for reading/writing to an optical disk, the optical device employing the optical system of FIG. 4, and also showing an optical disk and essential optical paths.

An exemplary optical device 200 employing the optical system 20 is shown in FIG. 5. The optical device 200 is for reading/writing to an optical disk 4. The optical device 200 includes the optical system 20, a semi-reflective mirror 25, an object lens 27, a collimator 28, and an optoelectronic detector 29.

In operation, the optical system 20 provides a collimated parallel round light beam to the semi-reflective mirror 25. The parallel round light beam passes through the semi-reflective mirror 25, and is then focused by the object lens 27 to a point on the optical disk 4, for reading data therefrom and/or writing data thereto. The light beam is modulated by the optical disk 4 according to the data recorded or the data to be written thereto, and then is reflected back to the object lens 27. The object lens 27 converts the light beam into a parallel light beam corresponding to information read from or written to the optical disk 4. The semi-reflective mirror 25 then reflects the parallel light beam to the collimator 28. The collimator 28 then focuses the parallel light beam onto the optoelectronic detector 29. The optoelectronic detector 29 is adapted for detecting information from the light beam received, converting such information into electronic signals, and outputting the electronic signals.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. An optical system for efficiently collimating elliptical light beams, comprising:
   a light source, for providing an elliptical light beam defining different diverging angles in different directions, wherein any cross-section of the elliptical light beam emitted from the light source defines a long axis and a short axis which are perpendicular to each other;
   a collimator, for converting the diverging elliptical light outputted from the light source into a parallel elliptical light beam; and
   at least two prisms, adapted for narrowing the long axis of the parallel elliptical light beam and maintaining the short axis of the parallel elliptical light beam unchanged, each of the at least two prisms having a first surface and a second surface defining an acute angle, wherein the first surface is perpendicular to the parallel elliptical light beam, so as to allow the parallel elliptical light beam to perpendicularly pass through the first surface and be refracted out from the second surface, and the at least two prisms include a first prism and a second prism successively arranged along a transmitting direction of the elliptical light beam emitted from the light source, and the elliptical light beam passes through the first prism and is refracted out from the second surface of the first prism and then perpendicularly reaches the first surface of the second prism.

2. The optical system as described in claim 1, wherein the first and second prisms are spaced a distance from each other.

3. An optical device for reading/writing to an optical disk, comprising:
   an optical system comprising;
   a light source, for providing an elliptical light beam defining different diverging angles in different directions, wherein any cross-section of the elliptical light beam emitted from the light source defines a long axis and a short axis which are perpendicular to each other;
   a collimator, for converting the diverging elliptical light outputted from the light source into a parallel elliptical light beam; and
   at least two prisms, adapted for narrowing the long axis of the parallel elliptical light beam and maintaining the short axis of the parallel elliptical light beam unchanged, each of the at least two prisms having a first surface and a second surface defining an acute angle, wherein the first surfaces surface is perpendicular to the parallel elliptical light beam, so as to allow the parallel elliptical light beam to perpendicularly pass through the first surface and be refracted out from the second surface, wherein the at least two prisms include a first prism and a second prism successively arranged along a transmitting direction of the elliptical light beam emitted from the light source, and the elliptical light beam passes through the first prism and is refracted out from the second surface of the first prism and then perpendicularly reaches the first surface of the second prism;
   a semi-reflective mirror, for allowing light beams from a first direction to pass therethrough and for reflecting light beams from a second direction, the second direction being substantially perpendicular to the first direction;
   an object lens for focusing parallel light beams to a point on an optical disk;
   a collimator for collimating light beams passed therethrough; and
   an optoelectronic detector, for receiving a light beam, detecting information from the light beam, converting the information into electronic signals, and outputting the electronic signals.

* * * * *